United States Patent
Sivak et al.

(10) Patent No.: US 6,465,385 B1
(45) Date of Patent: Oct. 15, 2002

(54) ZWITTERIONIC POLYMERIZATION CATALYST

(75) Inventors: Andrew Joseph Sivak, Pittsburgh, PA (US); Adolfo Zambelli, Baronissi (IT)

(73) Assignee: Sunoco, Inc. (R&M), Philadelphia, PA (US)

(*) Notice: Subject to any disclaimer, the term of this patent is extended or adjusted under 35 U.S.C. 154(b) by 0 days.

(21) Appl. No.: 09/502,622

(22) Filed: Feb. 11, 2000

Related U.S. Application Data

(60) Provisional application No. 60/119,984, filed on Feb. 12, 1999.

(51) Int. Cl.$^7$ .............................. C08F 4/44; B01J 31/38
(52) U.S. Cl. ........................ 502/152; 526/133; 526/134; 526/160; 526/943
(58) Field of Search ................................ 526/133, 134, 526/160, 943; 502/152

(56) References Cited

U.S. PATENT DOCUMENTS

| | | |
|---|---|---|
| 4,542,199 A | 9/1985 | Kaminsky et al. |
| 4,841,004 A | 6/1989 | Kaminsky et al. |
| 5,091,352 A | 2/1992 | Kioka et al. |
| 5,153,157 A | 10/1992 | Hlatky et al. |
| 5,416,179 A | 5/1995 | Welch et al. |
| 5,480,848 A | 1/1996 | Geerts |
| 5,834,393 A | 11/1998 | Jacobsen et al. |
| 5,869,723 A | 2/1999 | Hinokuma et al. |
| 5,955,625 A | 9/1999 | Canich |
| 5,965,677 A | 10/1999 | Stephan et al. |
| 5,986,028 A | 11/1999 | Lai et al. |
| 5,986,029 A | 11/1999 | Van Beek et al. |
| 5,994,255 A | 11/1999 | Nickias et al. |
| 6,002,035 A | 12/1999 | Chiang et al. |
| 6,013,595 A | 1/2000 | Lhost et al. |
| 6,291,610 B1 * | 9/2001 | Holtcamp .................... 526/127 |

OTHER PUBLICATIONS

Walter Kaminsky, "Polymerization and Copolymerization with a Highly Active, Soluble Ziegler–Natta Catalyst," Transition Metal Catalyzed Polymerizations Alkenes and Dienes Part A, Harwood Academic Publishers (Chur, London, New York), pp. 225–244 (unknown).

* cited by examiner

*Primary Examiner*—David W. Wu
*Assistant Examiner*—R. Harlan

(57) ABSTRACT

The present invention is a new catalyst compositions and methods of making and using the same. These compositions comprise organometallic salts with large noncoordinating anions which contain at least one terminal unsaturation and the high dipole moment Zwitterions that these can isomerize into. During polymerization, the ionic pairs are dispersed within the polymer particles. The length of space separating the positive and negative end of the Zwitterion also increase as a consequence of polymerization. Additionally, polymerization proceeds without the need of a co-catalyst.

14 Claims, No Drawings

ZWITTERIONIC POLYMERIZATION CATALYST

This application claims the benefit under 35 U.S.C. §119(e) of the co-pending provisional application of Serial No. 60/119,984 entitled "Zwitterionic Polymerization Catalyst" filed on Feb. 12, 1999, which is incorporated herein by reference,

TECHNICAL FIELD

The present invention is a new class of olefin polymerization catalysts, and methods of making the same. These new catalysts are characterized in that they are comprised of Zwitterions with significant dipole moments. Active site ion pairs are thus optimally formed of component ionic (one anionic and one cationic) moieties from different (Zwitteonic) molecules. During polymerizations that occur in nonpolar media the active species (i.e. ion pairs) become uniformly dispersed inside the polymer particles formed, while the length of the spacers separating the positive from the negative end of every Zwitterion increase as a consequence of the polymerization on the active metal-carbon bond of the catalyst.

BACKGROUND OF THE INVENTION

Metallocene catalysis is a relatively new field in the art of olefinic polymerization and provides homogeneous catalysts promoting ethylene polymerization as well as α-olefin polymerization to polymers of controlled structure (e.g. isotactic or syndiotactic polypropylene).

Traditional metallocene catalysts, as well as their manufacture are illustrated in the following prior art documents, which prior art documents are hereby incorporated by reference:

U.S. Pat. No. 4,542,199 describes the use of dihalo- and hydrocarbyl, halometallocenes with alumoxanes. U.S. Pat. No. 4,841,004 discloses a specific type of substituted metallocene to give 1-olefin stereoblock polymer. U.S. Pat. No. 5,091,352 describes various acceptable aluminum compounds suitable for use as cocatalysts with metallocenes and polymerization processes in the presence of isobutene.

U.S. Pat. No. 5,153,157 illustrates how the prior art references comprise a large non-limiting list of acceptable metallocene compounds which function in 1-olefin polymerization as well as the general use of large non-coordinating anionic cocatalytic components which is generally acknowledged to be one essential role of the alumoxane cocatalyst. U.S. Pat. No. 5,416,179 describes at least one non-alumoxane cocatalyst and a process for the polymerization of mono-1-olefins with metallocenes. U.S. Pat. No. 5,480,848 describes metallocene cocatalyst compositions containing acidic hydrogen free boron compounds with organoaluminoxy compounds.

One of the earliest descriptions of the metallocene methyl alumoxane (MAO) catalysts is found in the book "Transition Metal Catalyzed Polymerizations Alkenes and Dienes Part A" edited by Roderic P. Quirk et al., published for MNI Press by Harwood Academic Publishers, Chur, London, New York, specifically, an article entitled "Polymerization and Copolymerization with a Highly Active, Soluble Ziegler-Natta Catalyst" by Walter Kaminsky which begins on page 225 therein.

Prior art metallocene catalysts are either unsupported or supported The former catalysts are generally soluble in the reaction media of choice and lead to small polymer particles with uncontrolled morphologies. This is a limitation which makes polymer disengagement from the reaction medium more difficult than the previous generation of olefin polymerization catalysts which are the current norm. Other aspects of downstream processing are also more difficult.

Supporting metallocene catalysts overcome some of these process limitations, but introduce other complicating factors, such as the introduction of the supporting material which dilutes the active species and contributes potentially deleterious impurities to the final polymer. The supporting process may also perturb the active catalyst species, possibly reducing activity or altering the micro-structure of the polymer produce.

Therefore, it is the objective of the present invention to provide a catalyst promoting polymerization of ethylene and alpha olefins to isotactic, syndiotactic, predominantly isotactic or predominantly syndiotactic polymers which overcomes the limitations imposed by the prior technology. The tacticity of the polymer produced depends on the structure of the transition metal containing moiety, and so other tacticities to these are also possible. Even though the catalyst is not supported, granular polymer particles which are expected to be easily separated from the reaction medium can be formed. This polymer will be absent added impurities which supported materials would have added. An added improvement would be the process simplification attendant in not needing a cocatalyst.

Another objective of the present invention is to provide methods of making the catalysts of the present invention.

A further object of the present invention is to provide a method of using the catalysts of the present invention to catalyze polymerization reactions including the catalyst material and/or α-olefins.

SUMMARY OF THE INVENTION

The present invention relates to novel high dipole moment Zwitterionic metallocene catalysts which form by isomerization of an initially formed ionic metallocene catalyst. These catalysts comprise, an ionic pair shown below as (I). With the exception of the $R^I$, group (shown in I below), formula I is similar to known catalysts. The $R^I$ group is not expected to interfere with catalyst activity other than allowing an isomerizing olefin insertion onto the metal carbon bond. Because of this isomerization the specific zwitterionic compounds of this invention are formed. Thus, these catalysts are shown in the following formula (I) and via the above noted isomerization are derived from one or more ionic pairs having the following formulae:

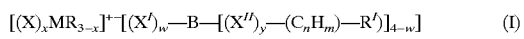

$$[(X)_x MR_{3-x}]^+ [(X^I)_w - B - [(X^{II})_y - (C_n H_m) - R^I)]_{4-w}] \quad (I)$$

wherein, $[(X)_x MR_{3-x}]^+$ designates any of the innumerable metallocene derived cationic active sites many examples of which can be found in the patents and literature generally and as cited above.

In these compounds X designates an organic moiety which contains a cyclopentadienyl, substituted cyclopentadienyl or other structure, as is commonly known in the art, which imparts the general designation "metallocene" and provides the bond of the X moiety to the metal "M." This moiety may be a unitary structure (x=1) in which case it may consist of, for example, one cyclopentadienyl containing structure. When x is 2, it may consist of two cyclopentadienyl or substituted cyclopentadienyl containing structures. These two cyclopentadienyl or substituted cyclopentadienyl moieties can be connected via a suitable bridge such as dimethylsilyl, diphenylsilyl, isopropylidene, 1,2ethanediyl, etc. Therefore, x is either 1 or 2 and indicates the number of expected metalcyclopentadienyl bonds.

R is a hydrocarbyl moiety. When attached to M (see below), it is preferably methyl. M is a metal usually selected from Ti, its congeners in Group IVB and the metals in the periodic table close to it including Group VB and VIB metals. Preferably, M is a transition Group IVB metal and most preferably Zr.

The $-[(X^I)_w-B-[(X^{II})_y-(C_nH_m)-R^I)_{4-w}]]$ substructure represents a subset of all possibilities which define the unique portion of what has been found and described herein $R^I$, is a terminal olefinic moiety. When n is not equal to 0 and m is not equal to 0 minimally it is $-CH=CH_2$ or if n=m=0 minimally it is $-CH_2-CH=CH_2$.

B is selected from Group IIIA, and is preferably Boron.

$X^I$ is a large electron withdrawing group, as is known in the art, preferably pentafluorophenyl ($C_6F_5$). The $R^I$ moiety is connected to boron optionally through $X^{II}$ which is a proper spacer, for example O or NR (R as above).

$C_nH_m$ is a connecting hydrocarbyl moiety with a and m chosen within the laws of valency, n is $\geq 0$. If n=0, then m=0. Otherwise $m \geq 0$. For purposes of economy from here on the ($C_nH_m$) moiety win be abbreviated "CH."

Additionally, w is 2 or 3 and y is 0 or 1.

The ionic pairs of the present invention are capable of reacting with the unsaturations of $R^I$ that is converted to $R^{II}$ (see below). Due to their high dipole moment the Zwitterionic pairs (exemplified below for the specific case where x=2, w=3 and y=1) can be self-associated potentially forming clusters or networks such as the following:

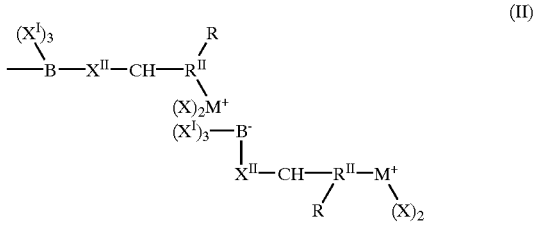

(II)

Note that the nature of the $R^I$ moiety has been altered (indicated above by $R^{II}$) during the isomerization which forms the Zwitterion due to the insertion of the olefin ($R^I$) into the M—R bond. For example, in the case of n=11, m=2 ("CH"=$CH_2$), with $R^I=CH_2-CH=CH_2$ where x=2, w=3, and y=1. The isomerization is as shown in (III).

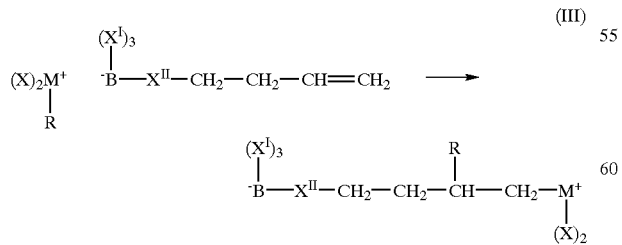

(III)

The olefinic $R^I$ was $-CH_2-CH=CH_2$. After isomerization of the terminal olefinic moiety (insertion onto M—R) it has become $R^{II}$ which is $$-CH_2-CH-CH_2-*$$
$$|$$
$$*$$

where the open valences (*) are now connected to R and M.

The selection of the connection between $R^I$ and B can influence the dipole moment of the isomerized compound. In cases where the geometry and stiffness of the bridge inhibit intramolecular charge attraction, high dipole moments are expected.

The above chain or cluster (II) is characterized in that every cation is covalently bonded to one anion, which is not its counterion, through the $-X^{II}-CH-R^{f(I)}-$ bridge. Though not shown above, a branched structure is also possible After the ionic pairs are associated the active sites are situated inside their own network or cluster. The intermolecular association is forced and required by the high dipole moment of each Zwitterionic molecule which in turn derives from the nature of the moiety bridging the boron atom and the $R^{II}$ group (i.e. $-(X^{II})_y-(C_nH_m)-$ in the previous formula and abbreviated $-X^{II}-CH-$ above).

Olefin polymerization occurs via monomer insertion at the M—$R^{II}$ bond. As a result, the length of the bridge increases as the polymerization process proceeds. The ionic pairs are separated increasingly as the polyolefin is produced. Thus in the case of ethylene polymerization the $-(X^{II})_y-(C_nH_m)-R^{II}(R)$ bridging moiety after j turnovers and before any chain termination reactions becomes $-(X^{II})_y-(C_nH_m)-R^{II}(R)-(CH_2-CH_2)_j-$ wherein j ethylene molecules have become inserted into the M—$R^{II}$ bond.

As the polymerization process begins, the close proximity of the ionic pairs promotes crystallization of the polymer chains. Then, as the ionic pairs are moved away from one another the catalytic sites become uniformly dispersed throughout the polymer matrix. This creates a pseudo-homogeneous catalyst by the end of the polymerization process.

One advantage of the above covalent/ionic bonded cyst is a resulting clustering of the polymer chains in the initial stages of polymerization with olefins. This creates the resultant granular polymer particles. Subsequent dispersion of the active sites during the intermediate propagation steps results in active sites randomly and homogeneously dispersed in formed polymer. This allows rapid diffusion of the monomer to the catalytic sites and avoids or reduces diffusion limitations on reaction rate and/or specificity as experienced in polyolefin processes catalyzed by supported catalysts.

DETAILED DESCRIPTION OF THE INVENTION

As can be seen from the above, the present invention is characterized by an active catalyst comprising the structure:

$$[DM^+—A—E^-]_x \quad (IV)$$

wherein, x is minimally 1. D designates any one of the possible metallocene sub-structures known in the art which are connected to the catalyst metal M. Preferably, D is a mono-, or di-. cyclopentadienyl or substituted cyclopentadienyl structure, bridged or unbridged through a connecting group.

M is selected from any one of the known metallocene transition metals, as described above. M is preferable selected from Group IVB, VB, and VIB. More preferably, M is a Group IVB metal. Most preferably, Zr or Ti. Note that the DM- structure is that of a typical metallocene catalyst as is known in the art.

A designates a connecting group comprising a hydrocarbyl containing structure, optionally containing a heteroatom structure.

E designates a large non-coordinating anion bonded through A to M. The structure of E is as is known in the art. Note that the structure of connecting group A is such that E is inhibited from acting as a coordinating anion for the metal M it is bridged to, and vice versa However, both M and E can, and preferably do, weakly coordinate with other oppositely charged moieties: E and M in other molecules.

Illustrative, but not limiting examples of possible non-coordinating anions (E) and metals (M) are shown in U.S. Pat. No. 5,153,157.

The catalyst is characterized in that olefinic polymerization is possible at the active metal site. Olefin insertion occurs at the $M^+$—A bond Thus, as polymerization proceeds, the distance between M and E increases.

It should be noted that in the above structure, polymerization is possible with the E or A of another structure if that E or A contains olefinic unsaturation.

Another way of characterizing the catalysts of the present invention is that they comprise ionic pairs (the active sites), wham each of the ion constituents of each pair is covalently bonded to:an ion of the opposite charge of another ion pair. This type of bonding can result in a network among the active species. The active sites are more or less homogeneously dispersed within the catalyst network.

In one embodiment of the present invention, the ionic pairs are self-associated. The self-associated network then serves as the catalyst for polymerizing α-olefin or co-polymerizing two or more olefins. In a preferred embodiment, the catalyst is utilized in propylene polymerization or ethylene-propylene co-polymerization processes.

There are several ways to obtain the active catalyst structure $[DM^+—A—E^-]_x$. The starting materials must contain olefinic unsaturation covalently bonded to either the transition metal, or more commonly, to the cationizing compound which is preferably a boron compound. If neutral compounds are combined, a sufficiently strong Lewis acid is employed to abstract an alkyl group from the metallocene metal. This process generates an anion at the former Lewis acid site and a cation at the transition metal shown below in (V):

(v)

Alternatively, a salt may be reacted with a neutral dialkyl oranometallic compound if the cationic portion of the salt is capable of de-alkyklating the alkyl metallocene. This is shown in part in (VI) below:

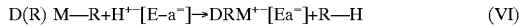

(VI)

Wherein "e" is a neutral precursor of the required anion. For example, if E is [—CH$_2$—B(C$_6$F$_5$)$_3$]$^-$ then e is B((C$_6$F$_5$)$_3$, and "a$^-$" is the incipient bridging group "A". For example, if A=—CH$_2$—CH(CH$_3$)— then a$^-$ is CH$_2$=CH—.

If a halo alkylmetallocene is used, a metal salt of the anion can be used in a transmetallation reaction analogous to the above reaction.

Once the initially formed complex:

(VII)

is obtained because of the M—R bond in the cation and the CH$_{12}$=CH— group in a$^-$ an isomerization produces the Zwitterionic polymerization catalyst which can be used immediately (even the initially formed complex may be used as the isomerization will proceed under olefin polymerization conditions), stored or even physically shaped or processed to affect ultimate polymer particle morphology. The isomerization involves insertion of the unsaturation in a$^-$ onto the M—R bond. The removal of the unsaturation converts a$^-$ to A.

The ultimate bridging group A may even be initially connected to the transition metal, as a$^-$, as shown below in (VIII & IX).

(VIII)

For example, if a$^-$ is —(CH$_2$)$_n$—CH=CH$_2$ and e is B(C$_6$F$_5$)$_3$, the reaction would be as follows:

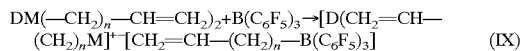

(IX)

and the isomerization would be as follows:

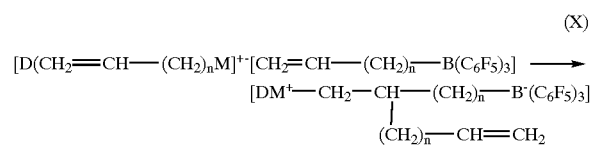

(X)

wherein, a$^-$ is $^+$(CH$_2$)$_n$—CH=CH$_2$

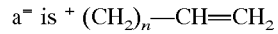

n≧1 e is B(C$_6$F$_5$)$_3$

It should be noted that the residual unsaturation in the bridging group is available for further reaction.

In another embodiment of the present invention, the catalyst is made by combining the compound X$_2$MR$_2$ (symbols as defined above) with a complex acid resulting from the reaction of one terminally unsaturated molecule, having an acidic —OH functionality, with tris (pentafluorophenyl) boron. Examples of such molecules include:

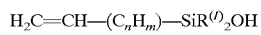

α-alkenyl-ω-fluoroalcohols (terminal or pendant —CF2OH groups), and

α-alkenyl-ω-fluorophenols (terminal or pendant —(C6P4)—OH groups)

wherein, each R$^{(f)}$ is R or R$^f$ (alkenyl or substituted alkenyl group) as noted above, and each —(C$_n$H$_m$)— comprises a divalent hydrocarbyl connecting group.

In another embodiment of the invention, the organometallic catalysts of the present invention are prepared by; reacting an alkali metal salt, such as lithium, of the non-coordinating anion with X$_2$M(Hal)R, wherein Hal is F, CL Br, or I.

In another embodiment of the invention, the organometallic catalysts of the present invention are prepared by reacting the compound $X_2MR_2$ with Broensted acidic compound affording noncoordinating anions bearing at least one terminal olefinic unsaturation, such as $[C_6H_5N(CH_3)_2H]^{+-}[(C_6F_5)_3B((CH_2)_6-CH=CH_2)]$.

In another embodiment of the invention, the organometallic catalysts of the present invention are prepared by reacting the compound $X_2MR_2$ wit a carbenium salt of an acid affording a non-coordinating anion bearing at least one terminal olefinic unsaturation, such as triphenylmethyl tris(pentafluorophenyl) 4(1,5-hexadien-1-yl)phenyl borate $([(C_6H_5)_3C]^{+-}[(C_6F_5)_3BC_6H_4-(CH=CH-(CH_2)_2-CH=CH_2)])$ triphenylmethyl tris(pentafluorophenyl)oct-1-enyl borate $([(C_6H_5)_3C]^{+-}[(C_6F_5)_3B((CH_2)_6-CH=CH_2)])$ or tropylium tris(pentafluorophenyl)oct-1-enyl borate $([(C_7H_7]^{+-}[(C_6F_5)_3B((CH_2)_6-CH=CH_2)])$.

In another embodiment of the invention, the organometallic catalysts of the present invention are prepared by reacting the compound $X_2MR_2$ wherein both of the R groups bear at least one terminal olefinic unsaturation, in effect being better represented in the formalism above as $X_2MR'_2$, with a cation compound which abstracts $R^-$ (or better $R'^-$) from $X_2MR'_2$, for example by reacting $X_2M((CH_2)_6-CH=CH_2)_2$ with $(C_6F_5)_3B$. These $X_2MR'_2$ compounds can be prepared in situ by reacting the corresponding halides $(X_2M)(Hal)_2)$ with $AlR'_3$ where the molar ratio of Al to M is equal to or larger than 2.

In another embodiment of the invention, the organometallic catalysts of the present invention are prepared by reacting the compound $X_2MR_2$ with a cationizing compound bearing at least one substitutent with a terminal olefinic unsaturation, that is $B(C_6F_5)_2[C_8F_4(CH_2-CH_2-CG=CH)]$.

The invention is illustrated, but not limited by the Examples that follow:

EXAMPLES

General

Catalyst syntheses, preparation for and actual polymerizations were performed under inert atmosphere using standard Schlenk and dry box techniques. Solvents and diluents were dried over sodium, or sodium/benzophenone under argon or nitrogen. Some precursors were prepared or packaged in air in which cases efforts were made to dehydrate and/or deaerate them before their utilization.

Catalyst Synthesis 1

In a dry box a vial was charged with 375 mg (0.861 mmol.) racemic dimethyl silane diyl (bis(2-methyl-1-indenyl) dimethyl zirconium) followed by a total of 14 g. of dried toluene. A separate vial was charged with 442 mg (0.864 mmol.) tris(pentafluorophenyl) boron, 129 mg (0.795 mmol.) dried and twice distilled 2,6-dimethyl 4-allyl phenol and about 9.4 g of dried toluene. The straw colored solution was transferred into a 50 ml Erlenmeyer flask. The vial was washed out with another 0.85 g of toluene which was also added to the Erlenmeyer flask. The zirconium containing solution was added quickly to the Erlenmeyer flask which initially gave an orange colored solution which deepened in color in a short period of time. Solids formation was noticed shortly thereafter and so a 55 g portion of the newly formed slurry was removed and utilized in an attempted polymerization of propylene (See Example 1 below.). The reaction mixture was allowed to sit undisturbed overnight. The volatiles were removed on a rotovap during about 6 hours. The next day the rotovapping was continued for about another 5 hours. The shiny dark solids were harvested and used in several attempted polymerization's.

Example 1

An initial polymerization was attempted using the crude material recovered from the above synthesis: The 5.5 g of liquid slurry from Catalyst Synthesis I was placed into a 100 ml gas inletted round bottom flask fitted with a magnetic stirring bar under an Argon flow. The flask was sealed and as quickly as possible evacuated and refilled with propylene to 1 atm. The propylene was polymerization grade and used without further purification. Two more evacuation and propylene refills were performed. Propylene consumption was noted but as the reaction proceeded the color of the solution be paler and propylene consumption slowed. Reaction was stopped after an hour and 181 mg of polypropylene were isolated.

The following general polymerization procedures were developed as a result of the work done in Example 1, and were used in the examples that follow.

Polymerization Procedure I

Catalyst was charged to a reaction flask, a gas inletted round bottom flask, either in the dry box or connected to a Schlenk line under Argon flow. If a diluent was used it was either heptane or toluene. In either case it was purified by refluxing under Argon over Na/benzophenone ketyl from which it was distilled. The flask containing the diluent/catalyst mixture was evacuated to remove the inert gas, Argon, and refilled with propylene. This evacuation/refill cycle was repeated one or two more times. Reaction times were said to begin after the last refill with propylene. Atmospheric propylene pressure was maintained via a bubbler. At the end of the reaction the monomer feed was stopped and acidified isopropanol was added to the flask. Polymer was isolated by filtration, washed a few times with isopropanol and/or acetone and vacuum dried at about 80° C. overnight.

Polymerization Procedure II

In essence this procedure was the same as Procedure I with the difference being there was extra purification of the monomer propylene. The monomer purification was done in two essentially identical modes.

Mode 1: A large argon purged flask was connected between the propylene source and the polymerization flask. This large flask was charged with around 20 to 50 ml of 25 w % tri-iso-butyl aluminum in heptane, cooled with a dry ice bath and evaluated. Then propylene was allowed to condense onto the tri-iso-butyl album solution with mechanical mixing. When an amount of monomer judged to be sufficient to conduct the intended polymerization was condensed in his flask the propylene source was turned off and mechanical agitation was continued for a short time. This purified monomer was used as in Procedure I.

Mode 2: Enough propylene was purified for use in multiple reactions by fast charging a metal cylinder of about 4l capacity with a few hundred ml of 25 w % tri-iso-butyl aluminum. The cylinder was next evacuated slightly and propylene was condensed in at dry ice temperature. The contents were thoroughly mixed and allowed to remain in contact for a few days before use. This purified monomer was used as in Procedure I.

Polymerization Procedure III

This procedure is a refinement of Procedure II with the augmentation being further purification of the diluent. Here solvent was purified as in Procedure I but after it was collected by distillation it was further treated by adding up to about 10 vol % of 25 w % (or possibly a 1.0 molar solution of) tri-iso-butyl aluminum in heptane. This solvent is the utilized as in Procedure I. It has been found that excess amounts of tri-iso-butyl aluminum depress the activity during polymerization. This no doubt is responsible for some of the low activities which were obtained.

Comparative Example 2a

Polymerization Procedure II was used with the following: the catalyst was 0.057 mmol of Zr as racemic dimethyl silane diyl (bis(2-methyl-1-indenyl) dimethyl zirconium) and 0.060 mmol tris(pentafluorophenyl) boron; 100 ml toluene, and run time of 30 minutes. About 2,24 g of a very fine powdery polypropylene were isolated which is about 78 g PP/mmol Zr per hour (or Zr-h).

Example 2b

Polymerization Procedure III was used with the following: the catalyst was 85 mg of Catalyst 1 (from Catalyst Synthesis I above) which, assuming all the starting material placed into the synthesis had been incorporated into the isolated material, corresponds to about 0.77 mmol. Zr; 100 ml toluene with about 10 ml 1.0 M tri-iso-butyl aluminum in heptane added; and a 45 minute runtime. About 15.9 g. of a much more granular polymer was isolated which is equivalent to 275 g PP/mmol Zr-h.

Example 2c (gas phase)

The residual Catalyst 1 from Catalyst Synthesis 1 above which remained on the walls of the flask in which the reaction mixture had been vacuum dried was utilized in an attempted gas phase polymerization. The flask was fitted with a gas inlet in the dry box, connected to a Schlenk line evacuated and refilled with propylene, purified as in Procedure II-Mode 1. The supply of propylene was, used up in about one hour. The flask was washed out with isopropanol and acetone. After workup 0.24 g of polypropylene was isolated. Since the actual amount of catalyst used was not known, yield was not able to be determined.

Next, a series high pressure polymerizations were performed which exemplify the main points and some factors which affect these catalysts and their polymerizations. The Zipperclave referred to below is an autoclave with a quick closure mechanism manufactured by Autoclave Engineers.

Comparative Example 3a

Rac-dimethyl silo diyl (bis(2-methyl-1-indenyl) dimethyl zirconium) (20 mg -0.046 mmol) was combined with tris (pentafluorophenyl) boron (22 mg -0.043 mmol) and about 10 ml toluene and allowed to react overnight. This mixture was placed in a glass addition funnel followed by 95 ml of toluene purified as described in Polymerization Procedure III; The funnel was then affixed to the Zipperclave all under an Ar flow. The contents of the addition funnel were flushed into the Zipperclave under Ar pressure. In quick succession the Zipperclave was pressured with propylene, purified as in Polymerization Procedure II-Mode 2, and vented. This pressurization then venting cycle was repeated again and then the Zipperclave was brought to 80 psig for the 1 hour reaction time. 6.583 g of crystalline polypropylene, 143 g PP/mmol Zr-h, were isolated.

Example 3b

This run was very similar to Example 3a except the catalyst was made as follows: 27 mug (0.062 mmol) of racemic dimethyl silane diyl (bis(2-methyl1-indenyl) dimethyl zirconium) was dissolved in a total of 2.6 g of toluene. A separate combination of 32 mg (0.063 mmol) of tris (pentafluorophenyl) boron in 1 ml toluene with 14 mag (0.086 mmol) of 2,6.dimthyl-1-allyl phenol was made. The zirconocene solution was added to the mixture and this mixture was transferred to the addition funnel with an additional 2 ml of toluene for use as the catalyst. 18.76 g of crystalline polypropylene, 303 g PP/mmol Zr-h, were isolated.

Example 3c

The identical procedure as used in Example 3b was employed with the following variations:
10 mg (0.062 mmol) of 2,6-dimethyl-4-allyl phenol was used;
The combined catalyst mixture was allowed to sit in the dry box overnight before being used.
16.64 g of crystalline polypropylene, 268 p PP/mmol Zr-h, were isolated.

Example 3d

Prior to the catalyst components 100 ml of heptane purified as described in Polymerization procedure III were placed in the Zipperclave via the addition funnel and saturated with propylene via two cycles as described in Example 3a. The exact same quantities of catalyst components and the same mode of combination as used in Example 3b were used. The catalyst mixture was placed in a syringe instead of an addition funnel. As the Zipperclave was being vented and with mild stirring the contents of the syringe were added to the Zipperclave. The syringe was washed out with 9 ml toluene because it appeared some purple solids were not transferred. The Zipperclave was sealed and brought to about 50 psig. After an hour 0.892 g of crystalline polypropylene, 14.39 p PP/mmol Zr-h, were isolated Examining the polymers produced in these runs shows that the particle size of the polymers produced from the instant polymeric catalyst is significantly larger than from prior art metallocene catalysts. A larger degree of control can be obtained with this invention than has been shown in the art by making a discrete synthesis of the polymeric catalyst and using this isolated material as a catalyst This route also offers the possibility of controlling the size and shape of the polymer ultimately produced.

Catalyst Synthesis 2

In a dry box a 50 ml Erlenmeyer flask was charged with 375 mg (0.861 mmol.) racemic dimethyl silane diyl (bis(2-methyl-1-indenyl) dimethyl zirconium) followed by 10 ml of dried toluene. A vial was charged with 441 mg (0.861 mmol.) tris(pentafluorophenyl) boron followed by 5 ml of toluene. To the boron containing solution were added 139 mg (0.857 mmol.) dried and twice distilled 2,6-dimethyl-4-allyl phenol. The straw colored solution was transferred into the 50 ml Erlenmeyer flask. The vial was washed out with about 1.75 ml of toluene which was added to the Erlenmeyer flask. The combination was accompanied by an initial orange color solution which deepened in color to a dark red brown in a short period of time. Solids formation was noticed shortly thereafter. These were sticky in texture. The reaction mixture was allowed to sit undisturbed overnight. The volatiles were removed on a rotovap during about 7 hours. The shiny dark solids were harvested. At this time the solids were not sticky and when finely divided it was clear they had a reddish purple color.

Example 4a

In essence the usual Zipperclave polymerization procedure was followed. The addition funnel was charged with 75 mg of the larger pieces of the solid produced in Catalyst Synthesis 2. This is equivalent to 29 mg of racemic dimethyl silane diyl bis(2-methyl-1-indenyl) dimethyl zirconium). The funnel was then charged with 100 ml of toluene purified as described in Polymerization Procedure III and this mixture was flushed into the Zipperclave. Propylene pressure was maintained at about 110 psig for 1 hour. After workup 7.72 g of crystalline polypropylene, 115 g PP/Zr-h, were isolated.

Example 4b

The procedure of Example 4a was repeated except that 76 mg of the larger pieces of the solid produced in Catalyst Synthesis 2 which is equivalent to 30 mg of racemic dimethyl. silane diyl bis(2-methyl-1-indenyl) dimethyl zirconium) were used and heptane purified as described in Polymerization Procedure III instead of toluene was used. Propylene pressure was maintained at about 110 psig for 1 hour. After workup 0.247 g of crystalline polypropylene, 3.6 g PP/Zr-h, were isolated

Example 4c

Example 4b was repeated with the exception that a rough selection was made for the finer pieces of the solid produced in Catalyst Synthesis 2.80 mg which is equivalent to 31 mg of racemic dimethyl silane diyl (bis(2-methyl-1-indenyl) dimethyl zirconium) were used. Propylene pressure was maintained at about 95 psig for 1 hour. After workup 0.334 g of crystalline polypropylene, 4.6 g PP/Zr-h, were isolated.
Catalyst Synthesis 3:

It was found that the racemic dimethyl silane diyl (bis(2-methyl-1-indenyl) dimethyl zirconium) starting material was contaminated with an off white material insoluble in toluene. This was removed by dissolution in toluene, filtration and vacuum drying. To a 50 ml Erlenmeyer flask in a dry box 0.654 mg (150 mmol) of this purified racemic dimethyl silane diyl (bis(2-methyl-1-indenyl) dimethyl zirconium) was added followed by about 25 ml of toluene. Separately a vial was charged with 770 mg (1.50 mmol) of tris (pentafluorophenyl)boron and about 8.5 ml of toluene. To this solution was added 247 mg (1.52 mmol) of 2,6-dimethyl4-allyl phenol purified as noted elsewhere herein. An initial yellow color faded to a straw color. The containers were sealed and the reagents were allowed to rest for about 2 hours. At the end of this time it was noted that the racemic dimethyl silane diyl (bis(2-methyl-1-indenyl) dimethyl zirconium) solution had acquired a distinct greenish tinge so the coloration could be described as greenish yellow. The boron/phenol mixture was diluted with a further 1.5 ml of toluene and then added to the racemic dimethyl silane diyl (bis(2-methyl-1-indenyl) dimethyl zirconium) solution in approximately 1.5 ml portions. Each such addition resulted in a transient red brown color and then an increasingly turbid orange solution. On the last addition the dark red brown color did not disappear. This mixture was allowed to rest overnight.

The reaction flask then contained a dark red brown solution, an orange precipitate lining the bottom of the flask and what appeared like nodules of shiny purple precipitate resting on the orange material. The solution was filtered and the flask washed with several portions of toluene. The toluene washing dislodged the purple nodules and made there easy to transfer to the filtration frit where they were vacuum dried. The orange solids were also vacuum dried and harvested. The filtrate similarly was vacuum dried The purple material was very slightly soluble in toluene bit the orange material seemed not to be soluble at all in toluene.

Example 5a

Polymerization Procedure III was used. The polymerization vessel was a 250 ml round bottom gas inletted flask. The diluent was 50 ml of purified toluene (Mode 2). The catalyst used was 69 mg the orange solid from Catalyst Synthesis 3 which is expected to contain 0.062 mmol Zr. The reaction was stopped after 1 hour. After workup 13.19 g(213 g PP/mmol Zr-h) of crystalline polypropylene were isolated.

Example 5b

Polymerization Procedure III was used. The polymerization vessel was a 250 ml round bottom gas inletted flask. The diluent was 50 ml of purified toluene (Mode 2). The catalyst used was 50 mg the orange solid from Catalyst Synthesis 3 which is expected to contain 0.045 mmol Zr. The polymerization solution was noted to be a pale yellow in color at the time of the run. Subsequently it was learned that this color indicated a deactivated catalyst presumably due to introduced poisons. Yet even at low conversion the polymer produced was of noticeably larger particle size than polymer produced from the usual metallocene catalysts even at higher conversions. The reaction was stopped after 1 hour. After workup 0.666 g (14 g PP/mmol Zr-h) of crystalline polypropylene were isolated.

Example 5c

Polymerization Procedure III was used. The polymerization vessel was a 250 ml round bottom gas inletted flask. The diluent was 50 ml of purified heptane (Mode 2). The catalyst used was 69 mg the purple solid from Catalyst Synthesis 3 which is expected to contain 0.062 mmol Zr. The reaction was stopped after 1 hour. After workup 0.118 g (1.9 g PP/mmol Zr-h) of crystalline polypropylene were isolated.

The above atmospheric pressure polymerizations can be compared to metallocene polymerizations catalyzed by polymethylalurnoxane PMAO exemplified by the following two runs:

Comparative Example 5d

Polymerization Procedure II was used. The polymerization vessel was a 250 ml round bottom gas inletted flask. The diluent was 20 ml of toluene. The catalyst used was 25 mg (0.057 mmol) of racemic dimethyl silane diyl (bis(2-methyl-1-indenyl) dimethyl zirconium). The cocatalyst was 12 ml of a toluene solution of PMAO giving a Al to Zr ratio of 648 to 1. The reaction was stopped after 1 hour. After workup 10.15 g (176 g PP/mmol Zr-h) of crystalline polypropylene were isolated.

Comparative Example 5e

Polymerization Procedure II was used. The polymerization vessel was a 250 ml round bottom gas inletted flask. The diluent was 20 ml of toluene. The catalyst used was 20 mg (0.046 mmol) of racemic dimethyl silane diyl (bis(2-methyl-1-indenyl) dimethyl zirconium). The cocatalyst was 10 ml of a toluene solution of PMAO giving an Al to Zr ratio of 675 to 1. The reaction was stopped after 1 hour. After workup 5.74 g (124 g PP/mmol Zr-h) of crystalline polypropylene were isolated.

Example 6a

The basic Zipperclave polymerization procedure as described for Example 3a was used with the following modifications:

The catalyst was 69 mg of the orange solid isolated from a synthesis like that described in Catalyst Synthesis 3 (However, not all of this made it into the Zipperclave); 100 ml of toluene purified as described in Polymerization Procedure III were used; Propylene pressure was maintained around 90 psig for the hour reaction. After workup 2.76 g (44 g PP/mmol Zr-h) of crystalline polypropylene were isolated.

Example 6b

The basic Zipperclave polymerization procedure as described for Example 6a was used with the following modifications:

The catalyst was 69 mg of the orange solid isolated from a synthesis like that described in Catalyst Synthesis 3. The diluent used was a mixture of 50 ml of toluene and 50 ml of n heptane both purified as described in Polymerization Procedure III.

After workup 2.37 g (38 g PP/mmol Zr-h) of crystalline polypropylene were isolated. This polymerization also gave very large particles of polymer.

Example 7

The basic Zipperclave polymerization procedure as described for Example 3a was used with the following modifications:

The catalyst was 69 mg of the orange solid isolated from a synthesis like that described in Catalyst Synthesis 3 (Not all of this made it into the Zipperclave);

100 ml of toluene purified as described in Polymerization Procedure III were used; Propylene pressure was maintained around 75 psig for the hour reaction. After work-up, 5.04 g of crystalline polypropylene were isolated. This polymerization gave very large particles of polymer. The largest isolated piece of polymer was approximately 3 cm in diameter.

The screen analysis of the polymers produced in most of these reactions are show in Tables I and Table II. Table I compares polymer from prior art metallocene catalysts to those of the present invention. Reaction conditions are similar for comparison. From this data it can be seen that in comparison with polymer produced under high pressure by traditional metallocene catalysts, as exemplified by Example 3a, polymers made with the dipolar Zwitterionic catalysts described herein (Examples 3b, 3c, and 3d) are generally larger in size. Note that in Example 3a polymer was produced at a rate of 143 g PP/mmol Zr-h and over 57 % of the polymer was less than 230 mesh while in Example 3b (303 g PP/mmol Zr-h) only 46 % and in Example 3c (268 g PP/mmol Zr-h) only about 22 % was smaller than 230 mesh. A degree of control of particle size distribution can be seen depending upon reaction conditions.

The polymer from Examples 4b and 4c (Table I) are particularly noteworthy in this since very large polymer particles (well over 90% larger than 80 mesh) were obtained even though polymer production rates were very low (around 4 g PP/mmol Zr-h). This one usual observation that polymer particles increase in size with conversion rates cannot be the explanation for the increased polymer particle sizes.

Table II shows the screen analysis of polymers produced in atmospheric pressure polymerizations and the results exactly parallel those obtained in autoclave, higher pressure polymerizations. Polymer from alumoxane co-catalyzed polymerizations with typical metallocene (Comparative Examples 5d and 5e) are similar to each other, but significantly smaller than polymer made without added co-catalysts by the catalysts of this invention (Examples 5a, 5b, and 5c).

The data in Tables III and IV indicate the main characteristic of metallocene catalyst polymers, namely the narrow molecular weight distribution is maintained by these new catalysts. It indicates there is no significant perturbation of the active sites producing the polymer. The $^{13}C$ NMR data in Tables support this conclusion.

TABLE I

Zipperclave (high pressure) polymerizations

| Polymer From Ex.# | Mesh (%) | | | | | |
|---|---|---|---|---|---|---|
| | +80 | +120 | +170 | +230 | −230 | Total |
| (Comp)3a | 9.52 | 4.53 | 11.14 | 17.64 | 57.17 | 100 |
| 3b | 1.86 | 2.59 | 5.30 | 44.22 | 46.02 | 99.99 |
| 3c | 1.25 | 5.17 | 11.26 | 59.47 | 21.55 | 98.66 |
| 3d | 45.25 | 6.53 | 5.34 | 10.33 | 33.85 | 101.3 |

TABLE I(a)

Zipperclave (high pressure) polymerizations

| Polymer From Ex.# | Mesh (%) | | | | | |
|---|---|---|---|---|---|---|
| | +80 | +120 | +170 | +230 | −230 | Total |
| 4a | 5.92 | 2.39 | 6.99 | 45.03 | 44.19 | 104.52 |
| 4b | 91.49 | 3.20 | 5.31 | — | — | 100 |
| 4c | 98.68 | 1.32 | — | — | — | 100 |
| 6a | 61.18 | 4.99 | 6.75 | 14.00 | 13.17 | 100.20 |
| 6b | 51.16 | 2.08 | 14.21 | 18.57 | 13.08 | 99.11 |

TABLE II

Atmospheric pressure polymerizations

| Polymer From Ex.# | Mesh (%) | | | | | |
|---|---|---|---|---|---|---|
| | +80 | +120 | +170 | +230 | −230 | Total |
| 5a | 22.10 | 2.84 | 7.95 | 23.90 | 41.75 | 98.54 |
| 5b | 18.36 | 4.86 | 6.68 | 11.99 | 55.84 | 97.72 |
| 5c | 21.67 | 17.50 | 19.17 | 19.17 | 18.00 | 94.51 |
| (Comp) 5d | 4.38 | 2.34 | 6.13 | 16.00 | 69.80 | 98.65 |
| (Comp) 5e | 3.98 | 7.63 | 10.50 | 18.74 | 58.32 | 99.17 |

TABLE III

Zipperclave (high pressure) polymerizations

| Polymer From Ex # | Molecular Weight Data | | | | $^{13}C$ NMR Pentad analysis | | |
|---|---|---|---|---|---|---|---|
| | Mn (1000) | Mw (1000) | Mw/Mn | Mz (1000) | mm (%) | mr (%) | rr (%) |
| (Comp) 3a | 31.4 | 68.8 | 2.19 | 162 | 94.80 | 3.79 | 1.41 |
| 3b | 22.3 | 47.8 | 2.14 | 122 | 96.12 | 2.82 | 1.06 |
| 3c | 22.6 | 56.4 | 2.49 | 304 | 96.66 | 2.53 | 0.81 |
| 3d | 16.1 | 50.1 | 3.11 | 122 | 95.51 | 3.59 | 0.90 |
| 4a | 14.9 | 29.7 | 1.99 | 53.9 | 95.91 | 3.05 | 1.04 |
| 4b | 20.0 | 50.2 | 2.51 | 99.3 | 93.79 | 3.61 | 2.60 |
| 4c | 18.7 | 47.6 | 2.54 | 96.8 | 92.33 | 5.97 | 1.70 |
| 6a | 20.6 | 79.4 | 3.85 | 251 | 93.87 | 4.49 | 1.64 |
| 6b | 21.2 | 79.4 | 3.76 | 216 | 93.74 | 4.44 | 1.82 |

TABLE IV

Atmospheric pressure polymerizations

| Polymer From Ex # | Molecular Weight Data | | | | $^{13}$C NMR Pentad analysis | | |
|---|---|---|---|---|---|---|---|
| | Mn (1000) | Mw (1000) | Mw/Mn | Mz (1000) | mm (%) | mr (%) | rr (%) |
| 5a | 28.1 | 72.9 | 2.59 | 139 | 91.63 | 5.90 | 2.47 |
| 5b | 11.8 | 51.3 | 4.33 | 122 bimodal | 92.73 | 5.34 | 1.93 |
|    | 25.7 | 57.0 | 2.21 | 123 1$^{st}$ peak | | | |
| 5c | 31.2 | 92.6 | 2.97 | 60.1 | 93.23 | 4.72 | 2.05 |
| (Comp) 5d | 28.9 | 58.4 | 2.02 | 93.2 | 93.72 | 4.53 | 1.75 |
| (Comp) 5e | 30.7 | 63.2 | 2.06 | 100 | — | — | — |

Catalyst Synthesis 4

Employing standard synthetic techniques (CH$_2$=CH—(CH$_2$)$_6$)(C$_6$H$_2$)$_2$—SiOH was prepared and preliminary purified NMR indicated that residual water remained in the isolated product. It was nonetheless used. A solution of 156 mg of (CH$_2$=CH—(CH$_2$)$_6$(C$_6$H$_5$)$_2$—SiOH in 3.2 g of toluene was prepared. To this was added a toluene (2 g) solution of trispentafluorophenyl boron (257 mg) followed by 3 g more of toluene. This mixture was stirred magnetically and warmed slightly. A small Erlenmeyer flask was then charged with 216 mg of racemic dimethyl silane diyl (bis(2-methyl-1-indenyl) dimethyl zirconium, which had been purified by recrystallization, followed by 5 g of toluene. The siloxy borate solution was added to the racemic dimethyl silane diyl (bis(2-methyl-1-indenyl) dimethyl zirconium solution. This addition was attended by a color change sequence which was very similar to that seen when 2,6-dimthyl-4-allyl phenol was used. Initial addition produced an orange color which became brown in time and as the combination proceeded. Within 10 minutes significant amounts of solids had formed and the solution at this point was transparent dark orange color. The toluene was removed under vacuum leaving brown and orange solids which were slightly sticky. The flask was sealed and placed in a freezer at about −30° C. About 518 mg of solids were harvested.

The sting bar from this synthesis was placed in a vial with about 3 ml of toluene. The vial was sealed and stirred overnight. After this the solids were still mostly undissolved and the toluene was only very slightly yellow to orange colored.

It was noted that by the next day after the solids were isolated they were noticeably less tacky even at room temperature.

Example 8

A preliminary test polymerization was conducted with the mixture of toluene and solids which had been adhering to the stirring bar used in Catalyst Synthesis 4. The vial was sealed with a septum and propene was purged through the vial accompanied by magnetic stirring. Within a minute of beginning the propene purge through the vial polymer formation was clear. Within 10 minutes a significant amount of polymer had formed and the reaction was stopped. Visual inspection and settling rate of the particles formed indicated that larger than expected polymer particles had been formed.

Catalyst Synthesis 5

Employing usual techniques triphenylmethyl tris (pentafluorophenyl) 4(1,5hexadien-1-yl)phenyl borate ([(C$_6$H$_5$)$_3$C]$^+$−[(C$_6$F$_5$)$_3$BC$_6$H$_4$—(CH=CH—(CH$_2$)$_2$—CH=CH$_2$)]) was prepared and purified by solvent extraction and crystallization. About 800 mg of triphenylmethyl tris(pentafluorophenyl) 4(1,5-hexadien-1-yl)phenyl borate was obtained. It was a tractable dark reddish brown or deep violet solid. About 453 mg of the triphenylmethyl tris (pentafluorophenyl) 4(1,5-hexadien-1-yl)phenyl borate followed by 4.7 g of toluene and a magnetic stirring bar were placed into a small Erlenmeyer flask. A dark brown solution with dark solids resulted. About 218 mg of racemic dimethyl silane diyl (bis(2-methyl-1-indenyl) dimethyl zirconium were added as a solid to the borate solution followed by another 8.3 g of toluene. Within about an hour of sting the solution became much more transparaent and acquired a distinct orange cast. After about 3 hours loose solids could be seen being thrown around by the stirring bar and tile solution had become clearer. This mixture was stirred overnight.

Vacuum removal of the toluene gave a shiny sticky solid which froze to a tractable solid in the −30° C. freezer. About 611 mg of brittle (when cold at least) purple solids which became orange powder on grinding were recovered. On warming to room temperature these solids were only slightly tacky.

Example 9

The basic Zipperclave polymerization procedure as described for Comparative Example 3a was used except for the following: The catalyst used was that made in Catalyst Syntheis 5; the transfer funnel was charged with 150 ml of freshly distilled toluene followed by 4 ml of 25 wt % tiisobutyl aluminum in heptane. About 130 ml of this solution was charged to the Zipperclave. To the residual toluene solution was added about 50 ml of freshly distilled heptane followed in turn by about 37 mg of the solid from Catalyst Synthesis 5. Polymerization was conducted at about 80 psig for about 3 and a half hours. About 13.6 g of crystalline polypropylene in the form of very large particles was obtained.

Catalyst Synthesis 6

Employing standard techniques triphenylmethyl tris (pentafluorophenyl)oct-1-enyl borate ([(C$_6$H$_5$)$_3$C]$^{+-}$[(C$_6$F$_5$)$_3$B((C$_2$)$_6$—CH=CH$_2$)]) was prepared and purified by solvent extraction and crystallization: two fractions were isolated and the material used was the first fraction. The vial containing this first fraction contained 0.52 g of the triphenylmethyl tris(pentafluorophenyl)oct-1-yl borate. To this vial was added 5 g of toluene and a macnetic stirring bar. About 265 mg of racemic dimethyl silane diyl (bis(2-methyl-1-indenyl) dimethyl zirconium were added as a solid to the borate solution followed by another approximately 5 g of toluene. After about an hour of stirring the a homogeneous looking dark orange solution was present. After about 2 hours a deep orange clear solution was noted. This mixture was stirred overnight.

The next day it looked like a mixture of red to orange red solution with solids had formed. Vacuum removal of the toluene gave a shiny sticky solid which froze to a tractable solid in the −30° C. freezer. About 655 mg of shiny reddish brown solids were recovered In this case too by the next day the catalyst solids were noticeably less sticky than when they were first isolated.

Example 10

In a manner analogous to that described in Example 8 a preliminary poly-test was conducted with a small amount of this material from Catalyst Synthesis 6 in a vial sealed with a septum cap. It looked like this catalyst was soluble in the toluene. Even so very large pieces of polymer were evident within 5 minutes of beginning the atmospheric pressure propene purge. It looked like even more polymer and larger particles of that polymer were formed than with the catalyst from Catalyst Synthesis 4.

Example 11

Essentially the same polymerization as described in Example 9 was used except that 40 mg of the solid isolated in Catalyst Synthesis 6 was used and run was ended after 3 hours. 1.56 g of polypropylene was isolated. Large chunks were isolated after vacuum drying but these chunks seemed to be composed of fine pieces though they were agglutinated. Because of this sticking together a true measure of the polymer particle size could not accurately be quantified. It was though definitely smaller than the polymer particle obtained from Example 9.

Catalyst Synthesis 7

Employing usual techniques dimethylanilinium tris (pentafluorophenyl) 4-(1,5-hexadien-1-yl)phenyl borate ($[[(HN(CH_3)_2C_6H_5]^+$$^-[(C_6F_5)_3BC_6H_4$$—(CH$$=$$CH$$—(CH_2)_2$$—CH$$=$$CH_2)]$) was prepared and purified by solvent extraction and crystallization. About 0.39 g (0.49 mmol.) of triphenylmethyl tris(pentafluorophenyl) 4(1,5-hexadien-1-yl)phenyl borate was dissolved in 4.0 g of toluene giving a gray greenish slightly translucent transparent solution. About 210 mg (0.482=ol.) of racemic dimethyl silane diyl (bis(2-methyl-lindenyl) dimethyl zirconium were placed in a small round bottom flask followed by a magnetic stirring bar. The borate solution was then pipetted into the round bottom flask. A vigorous reaction was noted immediately with apparent gas evolution and an accompanying strong reddish purple color. The borate containing vessel was washed with another 1.0 g of toluene which was added to the reaction mixture. This mixture was stirred in the dark for about 5 hours and then allowed to rest undisturbed overnight.

Two samples of this m each weighing 0.404 g. were reserved for polytesting. The remaining amount was added to a heart shaped flask containing about 24 g of n-heptane. The reaction flask was washed with another gram of toluene which was added to the heptane mixture followed by another 5 g of heptane. This mixture was allowed to settle for two days.

The pale orange solution was removed carefully and the dark purple solids left behind washed with about 6 g of heptane. This heptane, which essentially did not pick up any color, was removed after about 1.5 h of settling. The solids remaining in the heart shaped flask were vacuum dried for about 4 hours. 350 mg were isolated.

Example 12a

A glass addition funnel was charged with about 200 ml of toluene purified as described in Polymerization Procedure III with the addition of 1.0 ml of 25 w% tri-iso-butyl aluminum solution in heptane. About 150 ml of the toluene solution were flushed into the autoclave. One of the two samples weighing 0.404 g which had been reserved during Catalyst Synthesis 7 was next added to the toluene remaining in the addition funnel. This mixture was then forced into the Zipperclave under Argon pressure. In quick succession the Zipperclave was pressmen with (purified as in mode 2) propylene and vented. This pressurization then venting cycle was repeated again and then the Zipperclave was brought to about 90 psig for the 0.5 hour reaction time. The temperature rose to a maximum of 96° C. in the first minute of the reaction and it was necessary to cool the reactor back to near room temperature. 34.007 g of large particles of crystalline polypropylene, 1943 g PP/mmol Zr-h, were isolated.

Example 12b

A glass addition funnel was charged with about 150 ml of toluene purified as described in Polymerization Procedure III with the addition of 0.75 ml of 25 w % tri-so-butyl aluminum solution in heptane. The glass addition funnel was then charged with about 50 ml of n-heptane purified as described in Polymerization Procedure III with the addition of 0.25 ml of 25 w % tri-iso-butyl aluminum solution in heptane. To this was added 26 mg of solids isolated from Catalyst Synthesis 7, containing about 0,024 mmol. Zr. This mixture was then forced into the Zipperclave under Argon pressure. In quick succession the Zipperclave was pressured with (purified as in mode 2) propylene and vented. This pressurization then venting cycle was repeated again and then the Zipperclave was brought to about 100 psig for the 0.5 hour reaction time. The temperature rose to a maximum of 100° C. in the two minutes of the reaction and it was necessary to cool the reactor back to around 40° C. 35.536 g of large particles of crystalline polypropylene, 2961 g PP/mmol Zr-h, were isolated.

Example 12b

A glass addition funnel was charged with about 150 ml of toluene purified as described in Polymerization Procedure III with the addition of 0.75 ml of 25 w % tri-iso-butyl aluminum solution in heptane. It was then flushed into the autoclave under Argon pressure. The glass addition funnel was then charged with about 50 ml of n-heptane purified as described in Polymerization Procedure III with the addition of 0.25 ml of 25 w % tri-iso-butyl aluminum solution in heptane. To this was added 10 mg of solid catalyst from Catalyst Synthesis 7, containing 0.009 mmol. Zr. The contents of the addition funnel was flushed into the Zipperclave under Argon pressure. In quick succession the Zipperclave was pressured with ethylene (Matheson CP, 99.5%), and vented. This pressurization then venting cycle was repeated again and then the Zipperclave was brought to about 50 psig for the 0.25 hour reaction time. The temperature slowly rose to a maximum of 50° C. at 12 minutes into the reaction. At this point the reactor was cooled to near room temperature and the reaction was stopped shortly thereafter. 7.253 g of crystalline polyethylene, 3224 g PE/mmol Zr-h, were isolated.

Catalyst Synthesis 8

Employing standard inert atmosphere synthetic techniques racemic (bis indenyl)ethane dimethyl zirconium was synthesized from racemic (bis indenyl)ethane zirconium dichloride and methyl lithium and purified by recrystallization. A small Erlenmeyer flask was charged with 109 mg (0289 mmoL) of the racemic (bis indenyl)ethane dimethyl zirconium and 5.0 g of toluene. A $2^{nd}$ 50 ml Erlenmeyer flask was then charged with 150 mg (0292 mmol.) trig (pentafluorophenyl) boron and 2.0 g toluene. Then a small vial was charged with 48 mg (0.296 mmol.) dried and twice distilled 2,6-dimethyl-4-allyl phenol and then 1.0 g of toluene. The contents of the vial were pipetted into the flask containing the tris(pentafluorophenyl) boron. The vial was washed with another 1 g of toluene. The straw colored solution was agitated for about 2 minutes and then pipetted in aliquots into the 50 ml Erlenmeyer flask containing the zirconocene. The addition produced an orange turbid mixture which darkened near the end of the addition. The mixture was stirred overnight then vacuum dried. 266 mg of dark solids were harvested and used in the attempted polymerization of ethylene.

Comparative Example 13a

Racemic (bis indenyl)ethane dimethyl zirconium (4 mg -0.011 mmol) was combined with tris(pentafluorophenyl) boron (5 mg -0.010 mmol) in a Syringe. A glass addition funnel was charged with about 200 ml of toluene purified as described in Polymerization Procedure III with the addition of 0.5 ml of 25 w % tri-iso-butyl aluminum solution in heptane. About 150 ml of the toluene solution were flushed into the autoclave. About 5 ml of the remaining toluene solution was drawn up into the syringe. The syringe was agitated to ensure dissolution and reaction of the zirconocene and boron compounds. This mixture was then forced into the remaining toluene and this mixture was flushed into the Zipperclave under Argon pressure. In quick succession the Zipperclave was pressured with ethylene (Matheson CP. 99.5%), and vented. This pressurization then venting cycle was repeated again and then the Zipperclave was brought to about 20 psig for the 0.5 hour reaction time. The temperature rose to a maximum of 37° C. and ended at 29° . 7.653 g of crystalline polyethylene, 1444 g PE/mmol Zr-h, were isolated. A sample of this polymer was subjected to a wet screen analysis. The results are shown in Table V.

Example 13b

This run was very similar to Example 13a except the catalyst was made, just prior to use, as follows:

23 mg (0.061 mmol.) of racemic (bis indenyl)ethane dimethyl zirconium and about 2 ml of toluene were placed in a vial. A second vial was charged with 32 mg (0.063 mmol.) tris(pentafluorophenyl) boron, 1 ml toluene and 10 mg (0.062 mmol) of 2,6-dimthyl-4-allyl phenol. The borate solution was agitated and the zirconocene solution was added it. This mixture was taken up into a syringe and the vial were washed with small amounts of toluene which were also taken up into the syringe.

A glass addition funnel was charged with about 200 ml of toluene purified as described in Polymerization Procedure III with the addition of 0.5 ml of 25 w % tri-iso-butyl aluminum solution in heptane. About 150 ml of the toluene solution were flushed into the autoclave. The contents of the syringe were then forced into the toluene and this mixture in turn was flushed into the Zipperclave under Argon pressure. In quick succession the Zipperclave was pressured with ethylene (Matheson CP, 99.5%), and vented. This pressurization then venting cycle was repeated again and then the Zipperclave was brought to about 20 psig for the 0.5 hour reaction time. The temperature rose to a maximum of 35° C. and ended at 28° C. 8.396 g of crystalline polyethylene, 276 g PE/mmol Zr-h, war isolated. A sample of this polymer was subjected to a wet screen analysis. The results are shown in Table V.

Example 13c

A glass addition funnel was charged with about 150 ml of toluene purified as described in Polymerization Procedure III with the addition of 0.75 ml of 25 w % tri-iso-butyl aluminum solution in heptane. It was then flushed into the autoclave under Argon pressure. The glass addition funnel was then charged with about 50 ml of n-heptane purified as described in Polymerization Procedure III with the addition of 0.25 ml of 25 w % tri-iso-butyl aluminum solution in heptane. To this was added 12 mg of solid catalyst from Catalyst Synthesis 8: coining 0.012 mmol. Zr. The contents of the addition funnel was flushed into the Zipperclave under Argon pressure. In quick succession the Zipperclave was pressured with ethylene (Matheson CP, 99,5%), and vented. This pressurization then venting cycle was repeated again and then the Zipperclave was brought to about 20 psig for the 0.5 hour reaction time. The temperature rose to a maximum of 44° C. and ended at 35° C. 11.393 g of crystalline polyethylene, 1899 g PE/mmol Zr-h, were isolated. A sample of this polymer was subjected to a wet screen analysis. The results are shown in Table V.

TABLE V

| Polymer | Zipperclave Ethylene Polymerizations | | | | | | | | | |
|---|---|---|---|---|---|---|---|---|---|---|
| | Mesh (%) | | | | | | | | | |
| Ex. # | +25 | +35 | +45 | +60 | +80 | +120 | +170 | +230 | −230 | Total |
| (Comp) 13a | 1.4 | 0.8 | 0.3 | 0.6 | 3.4 | 14.8 | 24.1 | 27.2 | 27.5 | 100.1 |
| 13b | 4.9 | 1.8 | 10.2 | 37.7 | 35.9 | 8.3 | 1.1 | 0.2 | 0.0 | 100.1 |
| 13c | 8.7 | 17.4 | 19.6 | 26.9 | 13.7 | 4.6 | 3.9 | 4.4 | 0.8 | 100.1 |

Additional Examples

The following precursor catalyst compounds, which are all anilinium salts, have been prepared and tested:

AR=[H$_2$C=CH(CH$_2$)$_2$CH=CH—Ph—B(C$_6$F$_5$)$_3$]$^-$[H—N(Ph)(CH$_3$)$_2$]$^+$

C8=[H$_2$C=CH(CH$_2$)$_6$B(C$_6$F$_5$)$_3$]$^-$[H—N(Ph)(CH$_3$)$_2$]$^+$

C5=[H$_2$C=CH(CH$_2$)$_3$B(C$_6$F$_5$)$_3$]$^-$[H—N(Ph)(CH$_3$)$_2$]$^+$

C4=[H$_2$C=CH(CH$_2$)$_2$B(C$_6$F$_5$)$_3$]$^-$[H—N(Ph)(CH$_3$)$_2$]$^+$

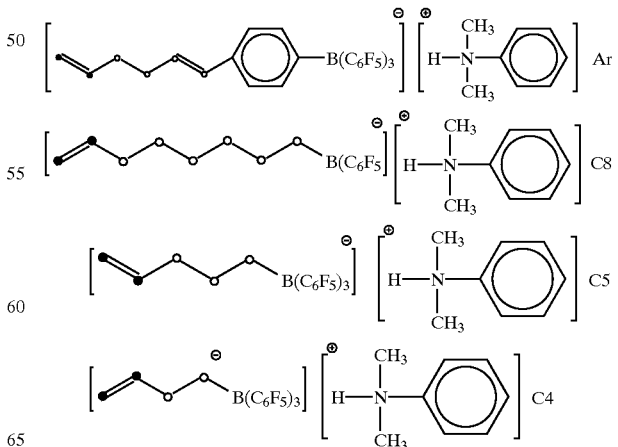

Two series of test polymerizations were performed. These two series were conducted to verify that active catalysts could be obtained with varied anilinium precursor catalyst compound salts, In all cases the polymer particles were larger than that obtained with catalysts made with traditional boron compounds and salts such as $B(C_6F_5)_3$ and $[HN(CH_3)_2C_6H_5]^+[B(C_6F_5)_3]^-$ combined with racemic (bis indenyl) ethane dimethyl zirconium. These polymerization were not optimized for activity.

The conditions for all the test polymerizations were the same. All polymerizations were cared out in 300 ml of toluene in presence of 0.3 mole of $Al(i-C_4h_9)_3$ at $PC_3H_6=5$ atm. The first set were done with the actual catalyst formed in situ by mixing the catalytic zirconium compound, racemic (bis indenyl)ethane dimethyl zirconium, with the precursor catalyst compound in the actual attempted polymerization. The details of these attempts and the results are shown in Table A below. The second set were done with pre-formed catalyst, made by pre-contacting the racemic (bis indenyl) ethane dimethyl zirconium with the precursor catalyst compound prior to introduction into the polymerization autoclave. The results and amounts are shown in Table B.

It can be seen by comparing data in Table B with data in Table A that larger polymer particles are obtained by performing the Zwitterionic catalyst described in this invention.

TABLE A

| Run | Catalyst (mol 10)$^{-6}$ | Precursor catalyst[1] used | Anilinium salt[1] (mol 10$^{-6}$) | Run Time (min) | Temp (° C.) | Yield (g) | Morphology of polymer (Size of grains) |
|---|---|---|---|---|---|---|---|
| AE1 | 5.1 | C8 | 5.1 | 15 | 15 | 0.11 | Small–medium |
| AE2 | 6.9 | C8 | 6.9 | 15 | 30 | 2.80 | Small–medium |
| AE3 | 16 | C8 | 16 | 20 | 50 | 76.10 | Small–medium |
| AE4 | 12 | C5 | 12 | 30 | 30 | 1.40 | Small |
| AE5 | 9.0 | C4 | 9.0 | 60 | 40 | 0.50 | Small–very small |
| AE6 | 14 | AR | 14 | 60 | 30 | 5.00 | Medium |

TABLE B

| Run | Catalyst (mol 10)$^{-6}$ | Precursor catalyst[1] used | Run Time (min) | Temp (° C.) | Yield (g) | Morphology of polymer (Size of grains) |
|---|---|---|---|---|---|---|
| AE7 | 5.1 | AR | 60 | 35 | 6 | large crystalline grains and very large agglomerations |
| AE8 | 6.9 | AR | 60 | 50 | 7 | large crystalline grains of uniform size |

Note for Tables A & B.
C8 = $[H_2C=CH(CH_2)_6B(C_6F_5)_3]^-[H—N(Ph)(CH_3)_2]^+$
C5 = $[H_2C=CH(CH_2)_3B(C_6F_5)_3]^-[H—N(Ph)(CH_3)_2]^+$
C4 = $[H_2C=CH(CH_2)_2B(C_6F_5)_3]^-[H—N(Ph)(CH_3)_2]^+$
AR = $[H_2C=CH(CH_2)_2CH=CH—Ph—B(C_6F_5)_3]^-[H—N(Ph)(CH_3)_2]^+$

What is claimed is:

1. A catalyst composition of the formula:

[DM$^+$—A—E$^-$]

wherein,
   M is a metallocene active metal cation and D is an active metal coordinating group;
   E is a large electron withdrawing group, and
   A is a connecting group selected from the group consisting of hyrdocaryls, substituted hydrocarbyls, hydrocarbyls containing heteroatoms, and substituted hydrocarbyls containing heteroatoms
   provided that when A is a hydrocarbyl containing heteroatoms or a substituted hydrocarbyl containing heteroatoms, said heteroatoms are connected to E.

2. A catalyst composition according to claim 1 wherein D is selected from the group consisting of a cyclopentadienyl, substituted cycolpentadienyl, dicyclopentadienyl, substituted dicyclopentadienyl, bridged dicyclopentadienyl and bridged substituted dicyclopentadienyl structures.

3. A catalyst according to claim 1 wherein M is a metal selected from Groups IIIB–IVB.

4. A catalyst according to claim 1 wherein A comprises —$C_2H_4$—.

5. A catalyst according to claim 1 wherein E comprises a pentaflurophenyl group.

6. A catalyst according to claim 1, wherein E comprises a metal selected from the group consisting of B, Al, Ga, In, or Tl.

7. A catalysts according to claim 1 wherein E comprises tris(pentaflurophenyl) boron.

8. A catalyst according to claim 1 wherein A—E arises from $B(C_6F_5)_2C_6F_4$—$CH_2CH_2$—$CH=CH_2$.

9. A catalyst composition with a significant dipole moment of the formula:

[DM$^+$—A—E$^-$]

wherein,
   M is a metallocene active metal cation and D is an active metal coordinating group;
   E is a large electron withdrawing group, and
   A is a connecting group selected from the group consisting of hyrdocaryls, substituted hydrocarbyls, hydrocarbyls containing heteroatoms, and substituted hydrocarbyls containing heteroatoms
   provided that when A is a hydrocarbyl containing heteroatoms or a substituted hydrocarbyl containing heteroatoms, said heteroatoms are connected to E.

10. A catalyst composition according to claim 9 wherein [DM$^+$—A—E$^-$]comprises [rac-dimethylsilyl-bis(2-methylIndenyl)Zr$^+$—(H)$_2$C—C(CH$_3$)H(CH$_2$)$_2$CH=CH—C$_6$H$_4$—B$^-$(C$_6$F$_5$)$_3$].

11. A catalyst composition according to claim 9 wherein D is selected from the group consisting of a cyclopentadienyl, substituted cycolpentadienyl, dicyclopentadienyl, substituted dicyclopentadienyl, bridged dicyclopentadienyl and bridged substituted dicyclopentadienyl structures.

12. A catalyst according to claim 9, wherein M is a metal selected from the group consisting of Sc, Y, La, Ti, Zr, and Hf.

13. A catalyst according to claim 9 wherein A comprises —$C_2H_4$—.

14. A catalyst composition to claim 9 wherein [DM$^+$—A—E$^-$]comprises [racemic (bis indenyl) ethane Zr$^+$—(H)$_2$C—C(CH$_3$)H(CH$_2$)$_2$CH=CH—C$_6$H$_4$—B$^-$(C$_6$F$_5$)$_3$].

* * * * *